United States Patent
Suzuki

(10) Patent No.: US 7,475,714 B2
(45) Date of Patent: Jan. 13, 2009

(54) PNEUMATIC TIRE WITH OUTER CARCASS PLY COMPRISING CIRCUMFERENTIALLY SPACED PIECES

(75) Inventor: Kazuya Suzuki, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 322 days.

(21) Appl. No.: 11/242,804

(22) Filed: Oct. 5, 2005

(65) Prior Publication Data

US 2006/0108043 A1    May 25, 2006

(30) Foreign Application Priority Data

Nov. 22, 2004   (JP) ............................. 2004-337866

(51) Int. Cl.
- *B60C 9/08* (2006.01)
- *B60C 9/02* (2006.01)
- *B60C 9/04* (2006.01)
- *B60C 9/18* (2006.01)
- *B60C 9/20* (2006.01)
- *B60C 9/24* (2006.01)
- *B60C 9/28* (2006.01)

(52) U.S. Cl. .................. 152/533; 152/526; 152/534; 152/538; 152/548; 152/550; 152/558; 152/560

(58) Field of Classification Search .......... 152/196–200, 152/526, 533, 548, 550, 558–560, 534, 535, 152/538
See application file for complete search history.

(56) References Cited

U.S. PATENT DOCUMENTS

| | | | |
|---|---|---|---|
| 3,237,673 A * | 3/1966 | Ward ......................... | 152/548 |
| 3,240,250 A | 3/1966 | Frazier | |
| 5,597,426 A * | 1/1997 | Ludwig ...................... | 152/200 |
| 6,701,987 B1 * | 3/2004 | Abbott .................... | 152/196 X |
| 2006/0090831 A1 * | 5/2006 | Yovichin et al. ............ | 152/526 |

FOREIGN PATENT DOCUMENTS

| | | |
|---|---|---|
| EP | 1 342 592-A2. | 9/2003 |
| JP | 2000-94903 A | 4/2000 |
| JP | 2001-71714 A | 3/2001 |

OTHER PUBLICATIONS

Mechanics of Pneumatic Tires, ed. Samuel Clark, US Department of Transportation, Aug. 1981, pp. 209 and 874.*
Abstract of EP 1 342 502 A2, Sep. 10, 2003.
Abstract of EP 1 342 592 A2, Sep. 10, 2003.

* cited by examiner

*Primary Examiner*—Adrienne C Johnstone
(74) *Attorney, Agent, or Firm*—Birch, Stewart, Kolasch & Birch, LLP

(57) ABSTRACT

A pneumatic tire comprises a tread portion, a pair of sidewall portions, a pair of bead portions each having a bead core therein, a carcass comprising an inner ply and an outer ply, the inner ply comprising a main portion extending between the bead cores through the sidewall portions and the tread portion and a pair of turnup portions each turned up around each of the bead cores from axially inside to axially outside of the tire, the inner ply substantially extending in a circumferential direction of the tire continuously, and the outer ply comprising a plurality of circumferentially spaced pieces each having radially inner ends which are not turned up around the bead core.

5 Claims, 4 Drawing Sheets

PNEUMATIC TIRE WITH OUTER CARCASS PLY COMPRISING CIRCUMFERENTIALLY SPACED PIECES

BACKGROUND OF THE INVENTION

1. Field of the Invention

The present invention relates to a pneumatic tire in which uniformity of the tire can be enhanced.

2. Description of the Related Art

A pneumatic tire is a complex comprising a combination of cord plies such as a carcass ply and a belt ply, and rubber components such as a tread rubber and a sidewall rubber such a tire is produced by incorporating these members to form a green tire, and by vulcanizing the green tire. However, non-uniformity is unavoidably generated in the green tire. This non-uniformity deteriorates the uniformity of a finished tire.

To enhance the uniformity of the tire, it is conventionally proposed to enhance the forming precision of each component. However, even if latest equipment of recent years is used, this method has a limitation in the enhancing effect.

Hence, the present inventors paid attention to the carcass which is a framework of the tire, and tried to enhance the uniformity. As illustrated in FIG. 4, a carcass ply "a" is formed through a primary ply c and a second ply f. The primary ply c includes a cord arrangement body b in which carcass cords are arranged in parallel to one another, and a topping rubber d for covering the cord arrangement body b.

The second ply f is formed by cutting the primary ply c into a plurality of pieces c1 having a predetermined size at a desired angle $\theta$ (about 75 to 90° in the case of a radial tire, and $\theta$ is 90° in the drawing) with respect to a length direction, and overlapping and jointing ends ce of the pieces c1 in succession. At that time, the pieces c1 are cut by length substantially equal to the width of the carcass ply "a". Thereby, primary joined portions j1 that connected the pieces c1 are uniformly formed in the second ply f. Further, carcass cords are arranged in the second ply f at the angle $\theta$ with respect to the longitudinal direction X. The second ply f is cut into length corresponding to a radius of the tire, and is utilized as the carcass ply for forming a green tire.

A lowermost portion of FIG. 4 illustrates the carcass ply "a" wound around the forming former (not shown). Opposite ends fe, fe of the second ply f are spliced to each other so as to form a cylindrical shape which is continuous in the circumferential direction of the tire.

Here, the primary joint portion j1 appears substantially uniformly in the circumferential direction. However, the splice portion j2 with respect to the joint portion j1 is prone to be varied among tires. Especially in the case of a tire in which the primary joint portion j1 and the spliced portion j2 are close to each other, a lower component of the uniformity is deteriorated. This generates large vibration and noise at the time of high speed running.

SUMMARY OF THE INVENTION

The present invention has been accomplished in view of such problems, and it is a main object of the invention to provide a pneumatic tire in which the uniformity is enhanced based on an idea that the structure of a carcass is improved.

In accordance with the present invention, the pneumatic tire comprises a tread portion, a pair of sidewall portions, a pair of bead portions each having a bead core therein, a carcass comprising an inner ply and an outer ply, the inner ply comprising a main portion extending between the bead cores through the sidewall portions and the tread portion, and a pair of turnup portions each turned up around each of the bead cores from axially inside to axially outside of the tire, the inner ply substantially extending in a circumferential direction of the tire continuously, and the outer ply comprising a plurality of circumferentially spaced pieces each having radially inner ends which are not turned up around the bead core.

DETAILED DESCRIPTION OF THE PREFERRED EXAMPLES

Embodiments of the present invention will now be described in detail in conjunction with the accompanying drawings.

Figure 1:
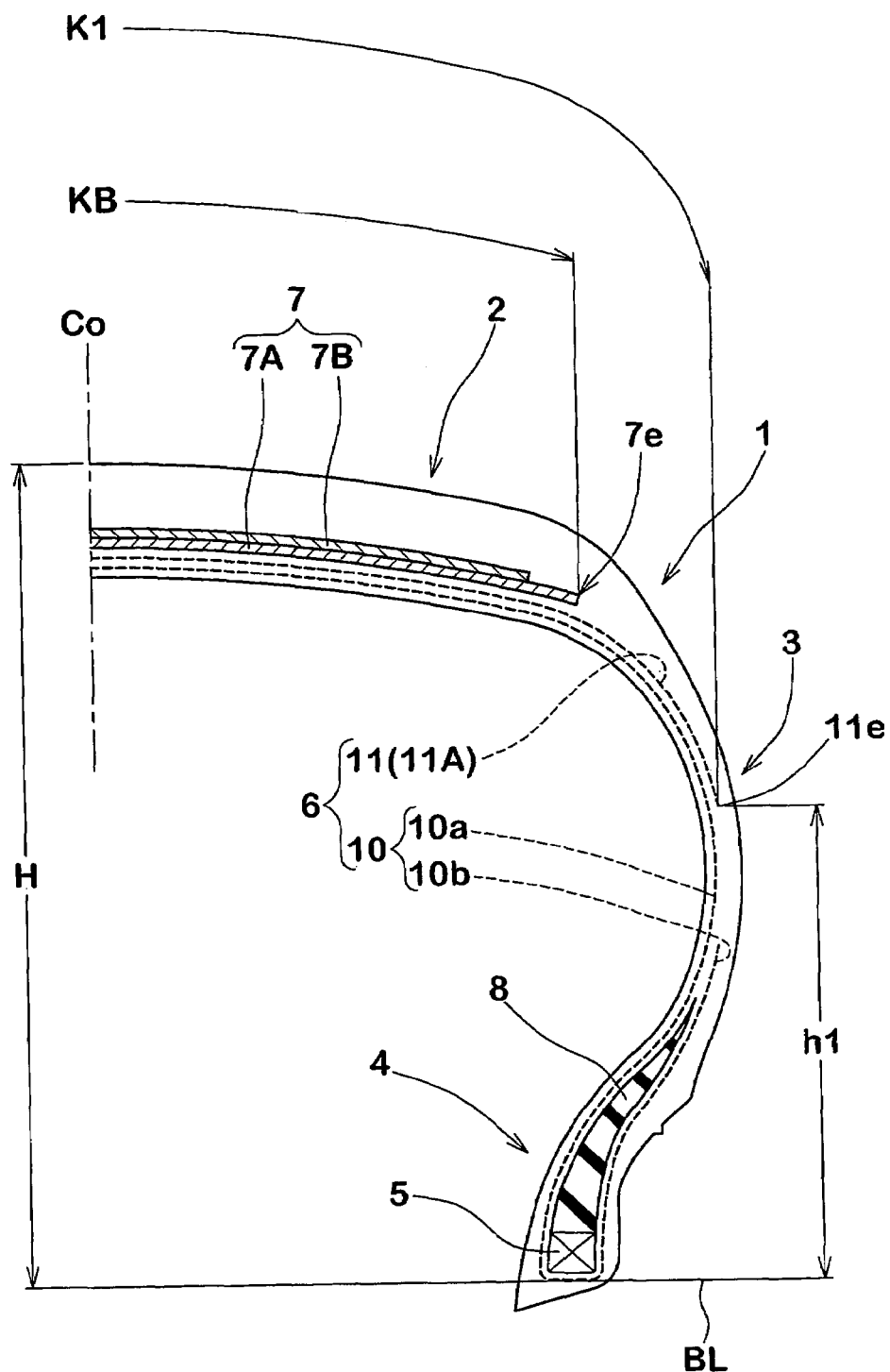
FIG. 1 is a cross sectional view showing one embodiment of a pneumatic tire of the present invention.

In FIG. 1, a pneumatic tire 1 for passenger car in accordance with present invention comprises: a tread portion 2; a pair of side wall portions 3; a pair of bead portions 4 each with a bead core 5 therein; a carcass 6 extending between the bead portions 4; and a belt 7 disposed radially outside the carcass 6 in the tread portion 2.

The belt 7 comprises at least two cross plies of rubberized parallel belt cords which are laid at an angle of from 10 to 35 degrees with respect to the tire equator Co. In this example, the belt 7 is composed of a radially outer ply 7B and a radially inner ply 7A. For the belt cords, steel cords, and high modulus organic fiber cords such as aramid, rayon and like can be used.

In order to further improve the high-speed durability of the belt 7, a band (not shown) which covers at least edge portions of the belt 7 can be disposed radially outside the belt 7. Here, the band is a cord layer made of at least one cord spirally wound, or parallel cords having at angle of from 0 to 5 degrees with respect to the circumferential direction of the tire. For the band cords, organic fiber cords, e.g. nylon, rayon, aramid and the like may be used.

In this embodiment, the carcass 6 comprises an inner ply 10 of cords and an outer ply 11 of cords disposed radially outside the inner ply 10. The cords of inner and outer plies 10 and 11 are arranged radially at an angle of from 75 to 90 degrees with respect to the tire equator Co.

For the carcass cords, organic fiber cords, e.g. nylon, polyester, rayon, aramid and the like and steel cords may be used.

The inner ply 10 extends between the bead portions 4 and turned up around the bead cores 5 from the inside to outside of the tire so as to form a pair of turnup portions 10b and a main portion 10a therebetween. In this embodiment, the inner ply is formed by splicing the opposite ends of a sheet ply in the circumferential direction of the tire such that the inner ply 10 substantially extends in a circumferential direction of the tire continuously.

Each bead portion 4 is provided between the main portion 10a and the turnup portion 10b with a rubber bead apex 8 extending and tapering radially outwardly from the bead core 5.

In the embodiment, the turnup portion 10b of the inner ply 10 has a so-called high turn up (HTU) structure in which the turnup portion 10b extends radially outward beyond an outer end of the rubber bead apex 8 with such a structure, the bead portion 4 and the sidewall portion 3 are effectively reinforced.

Figure 2:
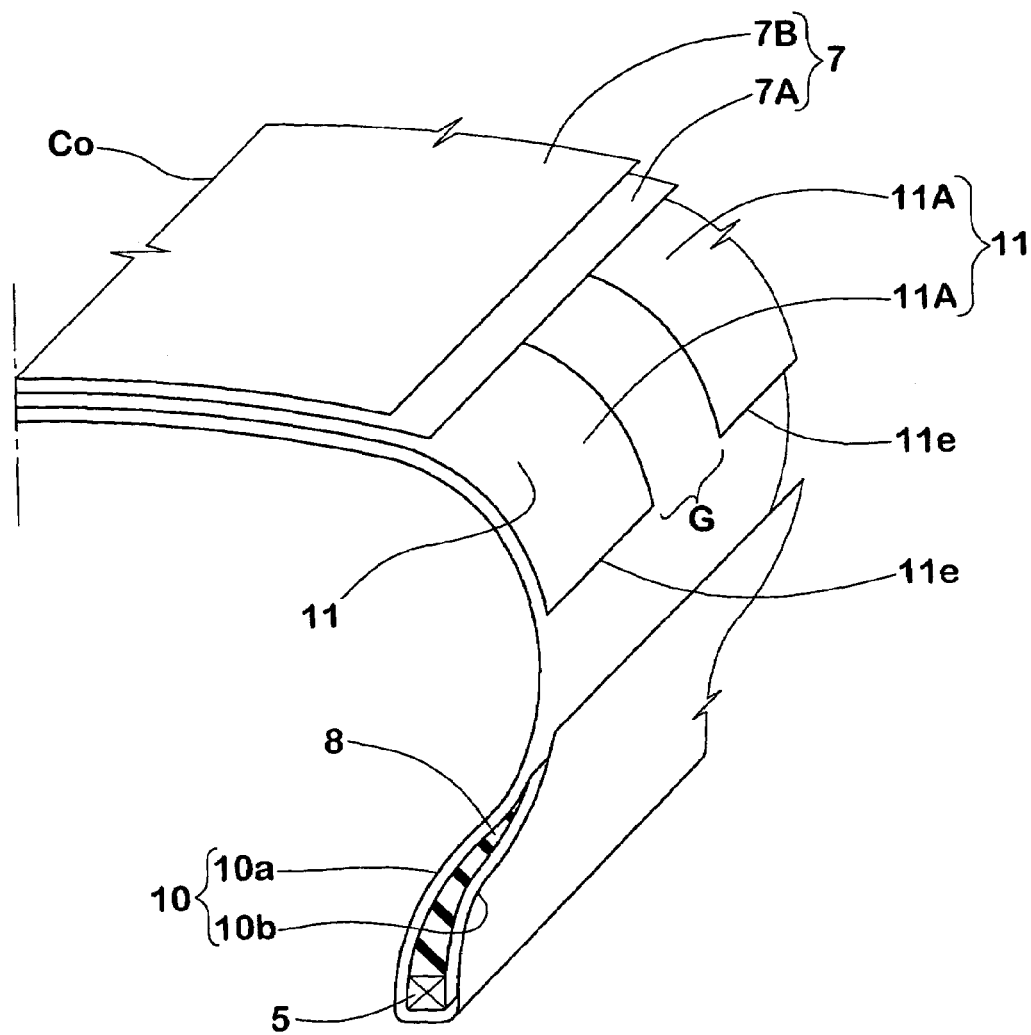
FIG. 2 is a schematic perspective view showing of an inner and an outer plies.

The outer ply 11 is an auxiliary ply. As illustrated in FIG. 2, the outer ply 11 comprises a plurality of circumferentially spaced pieces 11A each having radially inner ends 11e which are not turned up around the bead core 5. The pieces 11A extend along the main portion 10a of the inner ply 10. The radially inner ends 11e of the pieces 11A are provided radially outer side than the bead core 5. As a more preferable embodiment, the radially inner ends 11e are provided radially outer side than the radially outer edges of the turnup portion 10b.

Each piece 11A is disposed on the outermost side of the carcass 6. In a cross section including a tire axis, the radially inner ends lie of the pieces 11A are provided at substantially symmetric positions with respect to the tire equator C.

Figure 3:
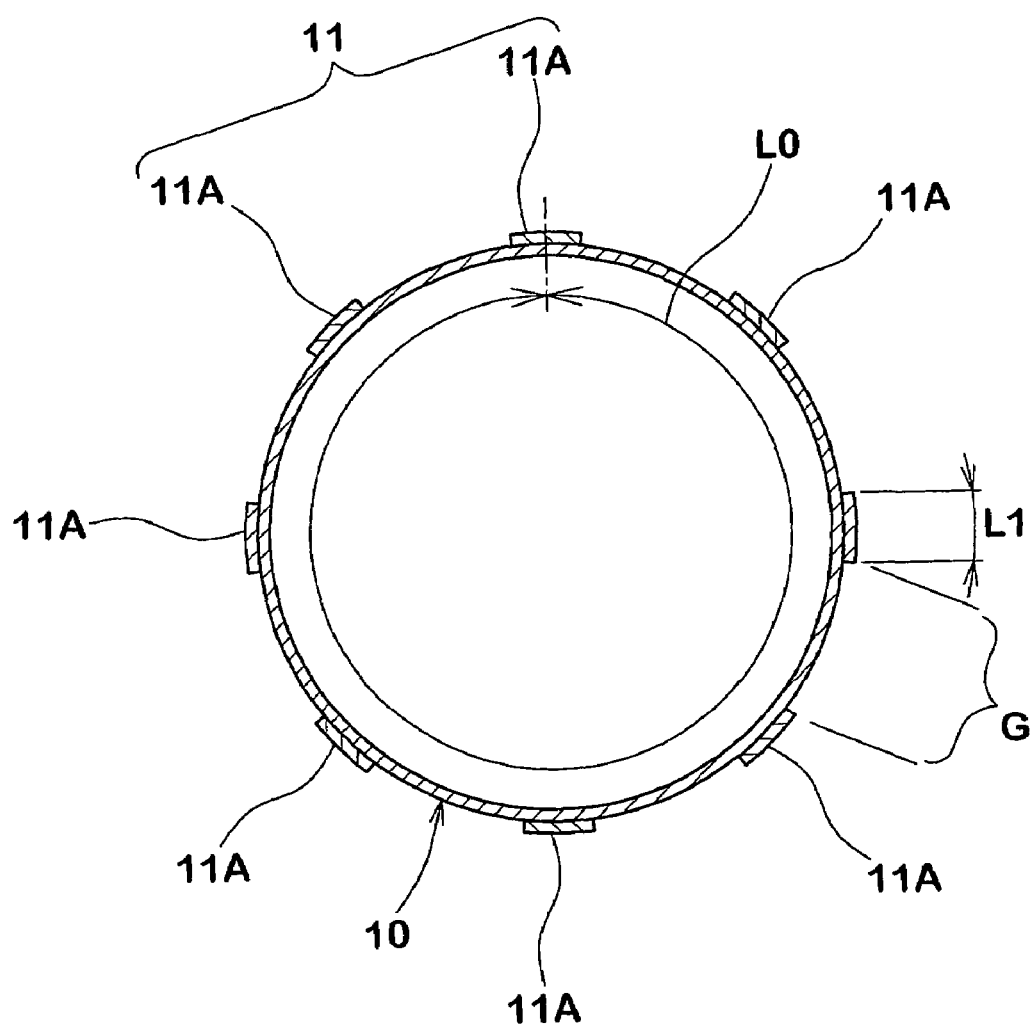
FIG. 3 is a schematic sectional view of disposition of the second ply at a tire equator.
Figure 4:
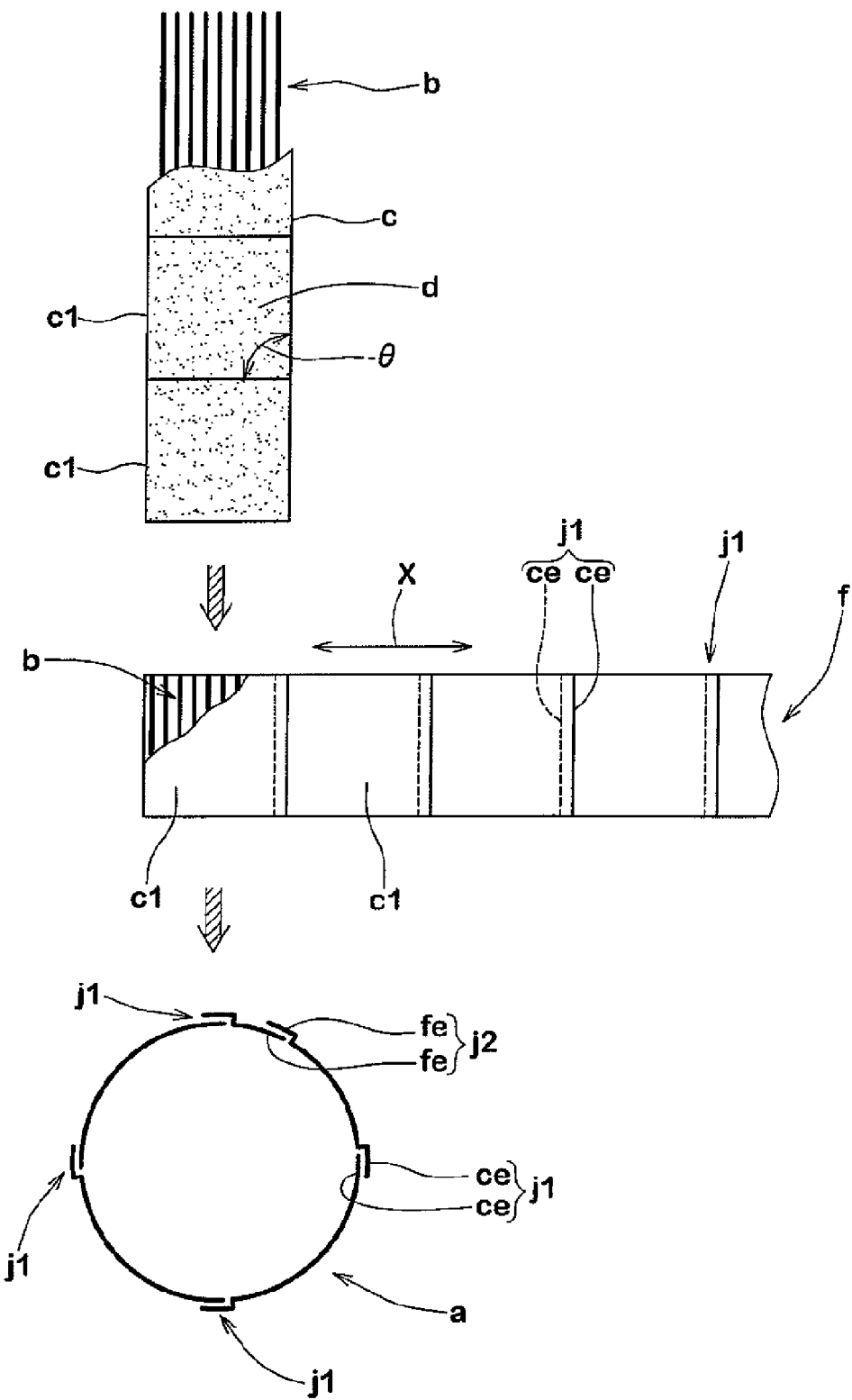
FIG. 4 is a diagram used for explaining a producing method of a carcass ply.

As illustrated in FIGS. 2 and 3, the pieces 11A are spaced in the circumferential direction of the tire with this structure, a distance G is provided between the pieces 11A which are adjacent to each other in the circumferential direction of the tire. In this embodiment, the pieces 11A are disposed at substantially equal distances G from one another in the circumferential direction of the tire.

In the carcass 6, the pieces 11A and the distances G are alternately and regularly repeated in the circumferential direction of the tire. As a result, in the outer ply 11, unbalance caused by the primary joint portion j1 and spliced portion j2 formed on the carcass 6 is widely dispersed in the circumferential direction of the tire (brought into higher level) with this, the uniformity of the tire is enhanced. Especially this effect is exhibited advantageously concerning the vibration and noise at the time of high speed running.

In the pieces 11A, since the opposite ends lie of the carcass cord are not turned up and become free ends, tension is not applied to the carcass cord when the tire is deformed, and since the carcass cords are radially arranged, even if the cords are disposed on the inner ply 10, the increase in bending rigidity can be suppressed to a low value. Therefore, it is possible to suppress the adverse influence on the tire performance which may be caused by the division, and to enhance the high speed uniformity.

Concerning the pneumatic tire of the present embodiment, measurement waveforms such as force variation (FV) were checked, and it was confirmed that projections of the primary and spliced portion j1 and j2 in the inner ply 10 were superposed on projecting waveforms which were periodically repeated by the pieces 11A and the distance G, so that the unbalance was brought into higher level.

To enhance the uniformity improving effect, it is preferable that the number of dispositions of the pieces 11A is three or more although it is not limited especially, and more preferably five or more, but nine or less, and more preferably eight or less.

To further enhance the uniformity, in a cross section of the tire 1 including the tire equator Co, it is preferable that a total circumferential length ΣL1 of the pieces 11A is not less than 5% of the circumferential length L0 of the inner ply 10, and more preferably not less than 10%, but not more than 80%, more preferably not more than 50%, and even more preferably not more than 30%. It is preferable that the length L1 of each piece 11A is not less than 10 mm, and more preferably not less than 30 mm.

To further enhance the uniformity of the tire, in the cross section of the tire 1 including the tire axis, it is preferable that the length K1 between the opposite ends 11e, 11e of the piece 11A along the contour thereof is not less than 50% of the length KB between edges 7e of the belt 7 along the contour thereof, and more preferably not less than 80%, and more preferably not more than 150%, and even more preferably not more than 120%. If the length K1 becomes less than 50% the length KB, enhancing effect of uniformity can not be sufficiently expected. on the other hand, if the length L1 becomes more than 150% the length KB, the tire rigidity is excessively increased, and the riding comfort is prone to be deteriorated.

In the case of the conventional tire, the primary joint and the spliced joint usually have overlap width of 5 to 10 mm and the number of joints is small and thus, projections and depressions are prone to be generated in the sidewall portion 3. However, according to the pneumatic tire of the embodiment, since the pieces 11A of the outer ply 11 and the distances G therebetween appear alternately, the projections and depressions appear inconspicuously. Therefore, the pneumatic tire 1 of the present embodiment has effect for enhancing the outward appearance of the sidewall portion 3.

To further enhance such an effect, in a standard state when the tire 1 is mounted on a standard rim and inflated by a standard pressure but loaded with no tire load, it is preferable that the height hi of the radially inner ends lie of the pieces 11A from the bead base line BL is not more than 85% the tire cross section height H, and more preferably not more than 75%. With this, it is possible to suppress the projections and depressions in a part which can be seen most clearly from outside, of the sidewall portion 3.

Although the preferred embodiment of the present invention has been described in detail, the invention is not limited to the illustrated embodiment, and the invention can variously be modified and carried out.

Comparison Test

Radial tires (size: 195/65R15) for a passenger having the structure as shown in FIG. 1 were produced based on the specification shown in Table 1. The uniformity of each tire was measured. The inner and outer plies of each tire have the following common specification.

Cord angle: +88° (with respect to tire equator)

Material of cord: polyester structure of cord: 1670 dtex/2

Cord density: 50 cords/5 cm

As the uniformity, radial force variation (RFV) of ten tires of each example was measured using a uniformity measuring device. Then, average values were obtained. Evaluations were displayed with indices in which the average value of the reference 1 was set 100. AS the numeric value is smaller, the uniformity is more excellent. The test conditions were as follows:

Rim: 15×6 JJ

Internal pressure: 200 kPa

Vertical load: 2.26 kN

Test speed: 140 km/h

TABLE 1

|  | Ref. 1 | Ref. 2 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Inner ply |  |  |  |  |  |  |  |  |  |  |  |
| (Number of plies) | 1 | 1 | 1 | 1 | 1 | 1 | 1 | 1 | 1 | 1 | 1 |
| Outer ply |  |  |  |  |  |  |  |  |  |  |  |
| Number of pieces disposed | — | 1 | 2 | 3 | 4 | 5 | 6 | 7 | 8 | 9 | 10 |
| Length L1 (mm) (*1) | — | 50 | 50 | 50 | 50 | 50 | 50 | 50 | 50 | 50 | 50 |
| Ratio (ΣL1/L0) (%) (*2) | — | 2.5 | 5.0 | 7.5 | 10.0 | 12.5 | 15.0 | 17.5 | 20.0 | 22.5 | 25.0 |
| Length K1 (mm) (*3) | — | 150 | 150 | 150 | 150 | 150 | 150 | 150 | 150 | 150 | 150 |
| Ratio (K1/KB) (%) (*4) | — | 80 | 80 | 80 | 80 | 80 | 80 | 80 | 80 | 80 | 80 |
| Uniformity (index) | 100 | 180 | 120 | 98 | 97 | 93 | 92 | 90 | 92 | 95 | 100 |

|  | Ex. 10 | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|
| Inner ply |  |  |  |  |  |  |  |  |  |  |  |
| (Number of plies) | 1 | 1 | 1 | 1 | 1 | 1 | 1 | 1 | 1 | 1 | 1 |
| Outer ply |  |  |  |  |  |  |  |  |  |  |  |
| Number of pieces disposed | 7 | 7 | 7 | 7 | 7 | 7 | 7 | 7 | 7 | 7 | 7 |
| Length L1 (mm) (*1) | 50 | 50 | 50 | 50 | 10 | 30 | 70 | 90 | 110 | 130 | 150 |
| Ratio (ΣL1/L0) (%) (*2) | 17.5 | 17.5 | 17.5 | 17.5 | 3.5 | 11.2 | 25.9 | 32.9 | 40.6 | 47.6 | 55.3 |
| Length K1 (mm) (*3) | 90 | 180 | 216 | 270 | 160 | 160 | 160 | 160 | 160 | 160 | 160 |
| Ratio (K1/Kb) (%) (*4) | 50 | 100 | 120 | 150 | 80 | 80 | 80 | 80 | 80 | 80 | 80 |
| Uniformity (index) | 102 | 91 | 92 | 100 | 101 | 96 | 92 | 97 | 98 | 98 | 98 |

|  | Ex. 21 | Ex. 22 | Ex. 23 | Ex. 24 | Ex. 25 | Ex. 26 |
|---|---|---|---|---|---|---|
| Inner ply |  |  |  |  |  |  |
| (Number of plies) | 1 | 1 | 1 | 1 | 1 | 1 |
| Outer ply |  |  |  |  |  |  |
| Number of pieces disposed | 7 | 7 | 7 | 7 | 7 | 7 |
| Length L1 (mm) (*1) | 170 | 190 | 210 | 230 | 250 | 270 |
| Ratio (Σ1/L0) (%) (*2) | 62.3 | 70.0 | 77.0 | 84.7 | 91.7 | 99.4 |
| Length K1 (mm) (*3) | 160 | 160 | 160 | 160 | 160 | 160 |
| Ratio (K1/Kb) (%) (*4) | 80 | 80 | 80 | 80 | 80 | 80 |
| Uniformity (index) | 98 | 98 | 98 | 99 | 100 | 100 |

In Table 1, (*1) to (*4) are as follows:
(*1): L1 is the length of the piece of the outer ply in the circumferential direction of the tire in cross section including tire equator.
(*2): L0 is the length of one turn of the first ply at the cross section.
(*3): K1 is the length between opposite ends of the piece of the outer ply in the cross section of tire including the tire axis measured along the contour thereof.
(*4): KB is the length between the opposite ends of the belt at the cross section of tire measured along the contour thereof.

As described above, according to the pneumatic tire of the present invention, deterioration of balance in rigidity caused by the primary joints and spliced portion of the carcass ply can be widely dispersed in the circumferential direction and can be brought into higher level. Therefore, the uniformity can be enhanced, and the advantageous effects can be exhibited especially at the time of high speed running.

The invention claimed is:

1. A pneumatic tire comprising
a tread portion,
a pair of sidewall portions,
a pair of bead portions each having a bead core therein,
a carcass and a belt disposed radially outside the carcass in the tread portion, the belt comprising at least two plies, the carcass comprising an inner ply of cords and an outer ply of cords,
the inner ply comprising a main portion extending between the bead cores through the sidewall portions and the tread portion, and a pair of turnup portions each turned up around each of the bead cores from axially inside to axially outside of the tire,
the inner ply substantially extending in a circumferential direction of the tire continuously, and
the outer ply consisting of three to nine circumferentially spaced pieces each having radially inner ends which are not turned up around the bead core,
the cords of the inner ply and the cords of each piece of the outer ply being laid at an angle of from 75 to 90 degrees with respect to the tire equator, and
in a cross section of the tire including the tire equator, a total circumferential length of the pieces is in the range of from 10 to 30% of a circumferential length of the inner ply.

2. The pneumatic tire according to claim 1, wherein
in a cross section of the tire including the tire axis, a length between opposite ends of the piece measured along the contour thereof is in the range of from 50 to 150% of a length between opposite edges of the belt along the contour thereof.

3. The pneumatic tire according to claim 1, wherein
the outer ply is disposed on the outermost side of the carcass.

4. The pneumatic tire according to claim 1, wherein
the inner ply is formed by splicing opposite ends of a sheet ply in the circumferential direction of the tire, and
the spliced portion of the inner ply is provided between the pieces which are adjacent to each other in the circumferential direction.

5. The pneumatic tire according to claim 1, wherein the pieces of the outer ply are disposed equally in the circumferential direction of the tire.

* * * * *